(No Model.)
A. L. ROSE.
PIPE VISE.
No. 334,615. Patented Jan. 19, 1886.
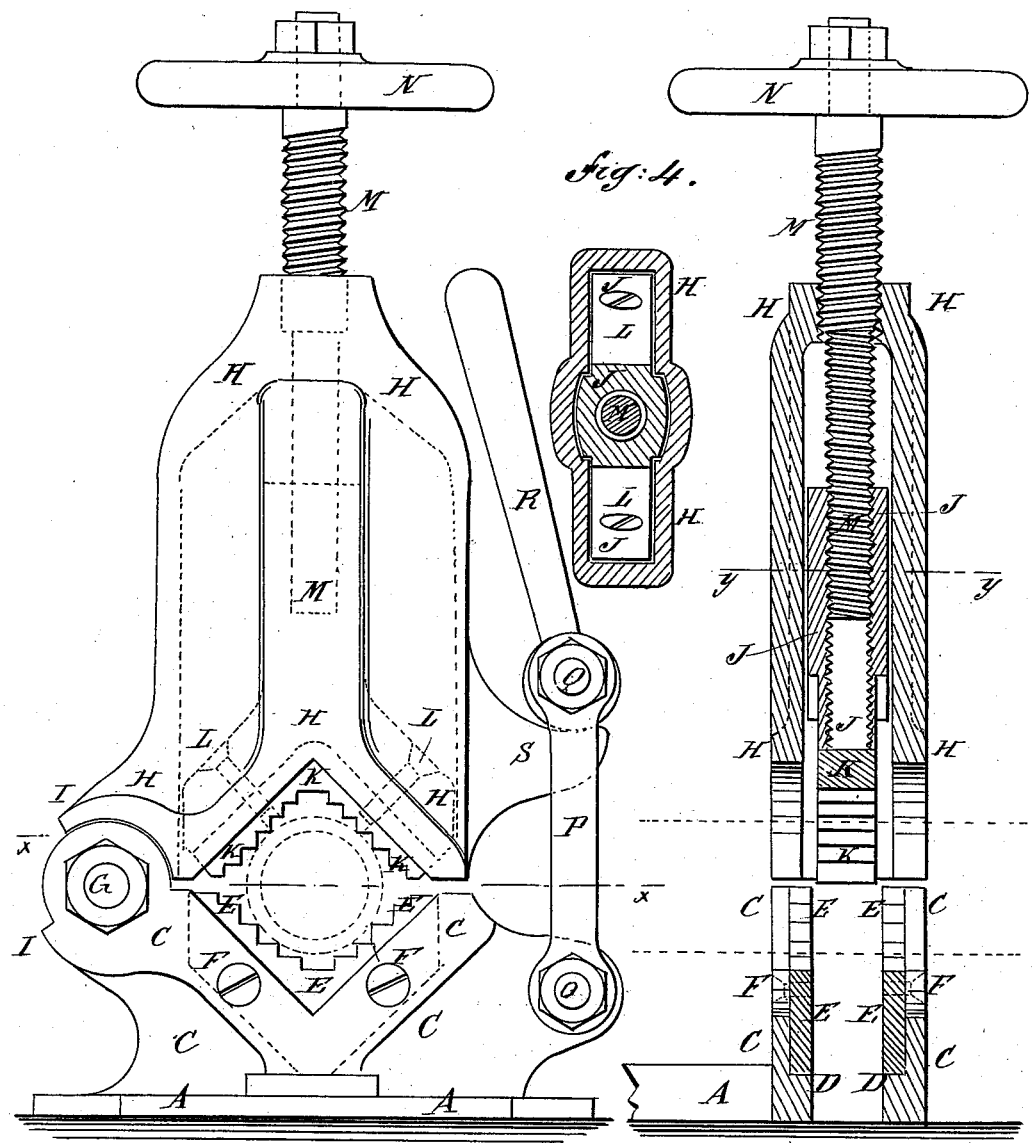

UNITED STATES PATENT OFFICE.

ANDREW L. ROSE, OF WEST TROY, NEW YORK.

PIPE-VISE.

SPECIFICATION forming part of Letters Patent No. 334,615, dated January 19, 1886.

Application filed July 21, 1885. Serial No. 172,198. (No model.)

*To all whom it may concern:*

Be it known that I, ANDREW L. ROSE, of West Troy, in the county of Albany and State of New York, have invented a new and useful Improvement in Pipe-Vises, of which the following is a full, clear, and exact description.

Reference is to be had to the accompanying drawings, forming a part of this specification, in which similar letters of reference indicate corresponding parts in all the figures.

Figure 1 is a side elevation of one of my improved vises, shown in position for holding a pipe. Fig. 2 is a sectional front elevation of the same. Fig. 3 is a sectional plan view of the same, taken through the line $x\ x$, Fig. 1. Fig. 4 is a sectional plan view of the same, taken through the line $y\ y$, Fig. 2.

The object of this invention is to provide pipe-vises constructed in such a manner that they will hold pipes securely while being cut off or while having screw-threads cut in them, which can be readily adjusted to hold pipes of different sizes, and which can be conveniently operated to clamp and release pipes.

The invention consists in the construction and combination of various parts of the pipe-vise, as will be hereinafter fully described.

A represents the base of the vise, which base has a slot, B, formed in it to receive a bolt for securing it to a bench, post, or other support in a vertical or horizontal position, as may be most convenient.

Upon the base A are formed two parallel flanges, C, the centers of the upper edges of which have V-shaped recesses formed in them, and are rabbeted at their inner sides to form V-shaped shoulders D, to serve as seats for the lower jaws, E, of the vise. The jaws E are made V-shaped, have teeth formed upon their upper inclined edges, and are secured in their seats by screws F, passing through the flanges C and into the said jaws E, as shown in Fig. 1 and in dotted lines in Figs. 2 and 3.

Upon the rear ends of the flanges C are formed lugs, to which is hinged by a bolt, G, a lug formed upon the lower rear corner of the upper part, H, of the vise-stock. The lugs of the flanges C and part H have shoulders I formed upon them to come in contact and prevent the said upper part from being swung too far back. The upper part, H, is made hollow to receive the stem J of the upper jaw, K, and has grooves in the inner surfaces of its sides to serve as guides to the said stem. The lower end of the stem J is widened, and has a V-shaped recess formed in it to form a seat for the V-shaped upper jaw, K, which has teeth on its inclined faces, and is secured to the V-shaped lower end of the stem J by screws L, passing through the arms of the lower end of the said stem and screwing into the said jaw. The jaw K and stem J are made of such a thickness that they can pass down into the space between the jaws E, and thus allow the said jaws to grasp a small pipe. The stem J is perforated longitudinally from its upper end, and has a left screw-thread cut in its inner surface to receive the left screw-thread formed in the smaller lower part of the hand-screw M. The larger upper part of the hand-screw M has a right screw-thread formed upon it to fit into the right screw-thread formed in the inner surface of the upper end of the part H.

To the upper end of the hand-screw M is attached a small hand-wheel, N, for convenience in operating the said screw.

Upon the forward ends of the flanges C is formed a lug, to which are pivoted by a bolt, O, the lower ends of two short bars, P.

To and between the upper ends of the bars P is pivoted by a bolt, Q, the cam-shaped lower end of the lever R, which engages with a projection, S, formed upon the forward edge of the part H of the stock.

In using the vise the lever-cam R is turned down and removed from the projection S. The part H of the stock is then swung back, and the pipe to be held is laid upon the lower jaws, E. The part H is then swung forward into a vertical position, and the hand-screw M is turned forward until the upper jaw, K, comes in contact with the pipe resting upon the lower jaws, E. The bars P are then swung upward, being the cam of the lever R upon the projection S, and the said lever-cam is then operated to force the part H downward, and cause the jaws K E to take a firm hold upon the pipe to be held.

Having thus fully described my invention, I claim as new and desire to secure by Letters Patent—

1. In a pipe-vise, the combination, with the base A and flanges C, carrying the lower jaws, E, and the hinged upper part, H, of the stock carrying the stem J and jaw K, and having projection S, of the pivoted bars P and the cam-lever R, pivoted in the upper ends of the said bars, substantially as herein shown and described, whereby the jaws are made to grasp the pipe firmly and the screw relieved of strain, as set forth.

2. In a pipe-vise, the combination, with the upper part, H, of the stock having a right screw-thread in the inner surface of its upper end, and the stem J, carrying the upper jaw and having an interior left screw-thread, of the hand-screw M, having a right screw-thread on its large upper part and a left screw-thread on its smaller lower part, substantially as herein shown and described, whereby the said upper jaw can be quickly adjusted, as set forth.

ANDREW L. ROSE.

Witnesses:
 C. D. HUDSON,
 RICHARD BLACKBURN.